(12) United States Patent
Sanno

(10) Patent No.: US 9,083,939 B2
(45) Date of Patent: Jul. 14, 2015

(54) MOVING IMAGE PLAYBACK APPARATUS, CONTROL METHOD THEREFOR, AND RECORDING MEDIUM

(71) Applicant: CANON KABUSHIKI KAISHA, Tokyo (JP)

(72) Inventor: Masato Sanno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 13/938,647

(22) Filed: Jul. 10, 2013

(65) Prior Publication Data

US 2014/0023342 A1 Jan. 23, 2014

(30) Foreign Application Priority Data

Jul. 23, 2012 (JP) ................................ 2012-163072

(51) Int. Cl.
*H04N 5/783* (2006.01)
*H04N 9/87* (2006.01)
*H04N 5/77* (2006.01)

(52) U.S. Cl.
CPC ................ *H04N 9/87* (2013.01); *H04N 5/772* (2013.01); *H04N 5/783* (2013.01)

(58) Field of Classification Search
CPC .......... H04N 9/87; H04N 5/772; H04N 5/783

USPC .................................................. 386/241, 350
See application file for complete search history.

(56) References Cited

U.S. PATENT DOCUMENTS

| 2005/0163480 | A1* | 7/2005 | Takemoto ........................ 386/69 |
| 2006/0135057 | A1* | 6/2006 | Park et al. .................... 455/3.06 |
| 2008/0317433 | A1* | 12/2008 | Hamada .......................... 386/68 |
| 2009/0226149 | A1* | 9/2009 | Shibata et al. .................. 386/95 |
| 2011/0067059 | A1* | 3/2011 | Johnston et al. ................ 725/39 |
| 2012/0033944 | A1* | 2/2012 | Hattori et al. ................ 386/248 |

FOREIGN PATENT DOCUMENTS

JP 2005-151069 A 6/2005

* cited by examiner

*Primary Examiner* — William Tran
(74) *Attorney, Agent, or Firm* — Cowan, Liebowitz & Latman, P.C.

(57) ABSTRACT

One of a plurality of skip search modes including a first skip search mode in which the playback position of moving image data currently played back is changed to a frame a predetermined time before or after a frame currently played back, and a second skip search mode in which the playback position of the moving image data currently played back is changed to a frame corresponding to a chapter before or after the frame currently played back is selected according to the moving image data currently played back.

11 Claims, 3 Drawing Sheets

MOVING IMAGE PLAYBACK APPARATUS, CONTROL METHOD THEREFOR, AND RECORDING MEDIUM

BACKGROUND OF THE INVENTION

1. Field of the Invention

The present invention relates to a moving image playback apparatus, a control method therefor, and a recording medium.

2. Description of the Related Art

In moving image playback, in addition to operations such as playback, fast-forward, and rewind at normal speed, it is generally possible to execute skip playback by jumping from the current playback position to another playback position to play back a moving image. Japanese Patent Laid-Open No. 2005-151069 describes a special skip search mode in which a search change position detected in a recording operation is used to skip a playback position and a normal skip search mode in which a specific period is skipped. According to Japanese Patent Laid-Open No. 2005-151069, the user operates a switching means to switch between those skip search modes.

To execute skip playback of a moving image in a skip search mode desired by the user, he/she generally needs to switch between the skip search modes by himself/herself. Furthermore, in order for the user to perform a skip search mode switching operation, an operation member for switching between the skip search modes is necessary. If the user wants to change a period to be skipped depending on a moving image in the normal skip search mode in which a specific period is skipped, an operation of selecting such period is complicated.

For a video player or the like, there is still a space in an operation unit, and thus it is possible to arrange, in a remote controller, a button such as a button for skipping a predetermined time or a button for skipping based on chapters in accordance with the skip search mode. In an apparatus including a limited operation member, such as a handy type video camera, however, it is necessary to share a skip button by a plurality of skip search modes, and to perform an additional operation of selecting a desired skip search mode, thereby complicating the operation.

SUMMARY OF THE INVENTION

The present invention has been made in consideration of the aforementioned problems. For example, an embodiment of the present invention has as its object to facilitate a user operation required for a skip search mode, thereby improving the usability.

According to one aspect of the present invention, for example, there is provided a moving image playback apparatus comprising: a playback unit configured to play back moving image data recorded in a recording medium; and a controller configured to change a playback position of the moving image data played back by the playback unit according to a user operation, wherein the controller selects, according to the moving image data currently played back, one of a plurality of skip search modes including a first skip search mode in which the playback position of the moving image data currently played back is changed to a frame a predetermined time before or after a frame currently played back, and a second skip search mode in which the playback position of the moving image data currently played back is changed to a frame corresponding to a chapter before or after the frame currently played back.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings. However, the present invention is not limited to the following embodiments. Note that the following embodiments are not intended to limit the scope of the appended claims, and that not all the combinations of features described in the embodiments are necessarily essential to the solving means of the present invention.

Each functional block described in the embodiments need not always be an individual hardware component. That is, for example, the functions of some functional blocks may be executed by one hardware component. Alternatively, several hardware components may cooperate with each other to execute the function or functions of one or a plurality of functional blocks.

A preferred embodiment of the present invention will be described below with reference to the accompanying drawings. Although a case in which the present invention is applied to a digital camera will be explained below, the present invention is not limited to this. For example, the present invention is applicable to various moving image playback apparatuses capable of displaying a moving image, such as a mobile phone and video camera.

Figure 1:
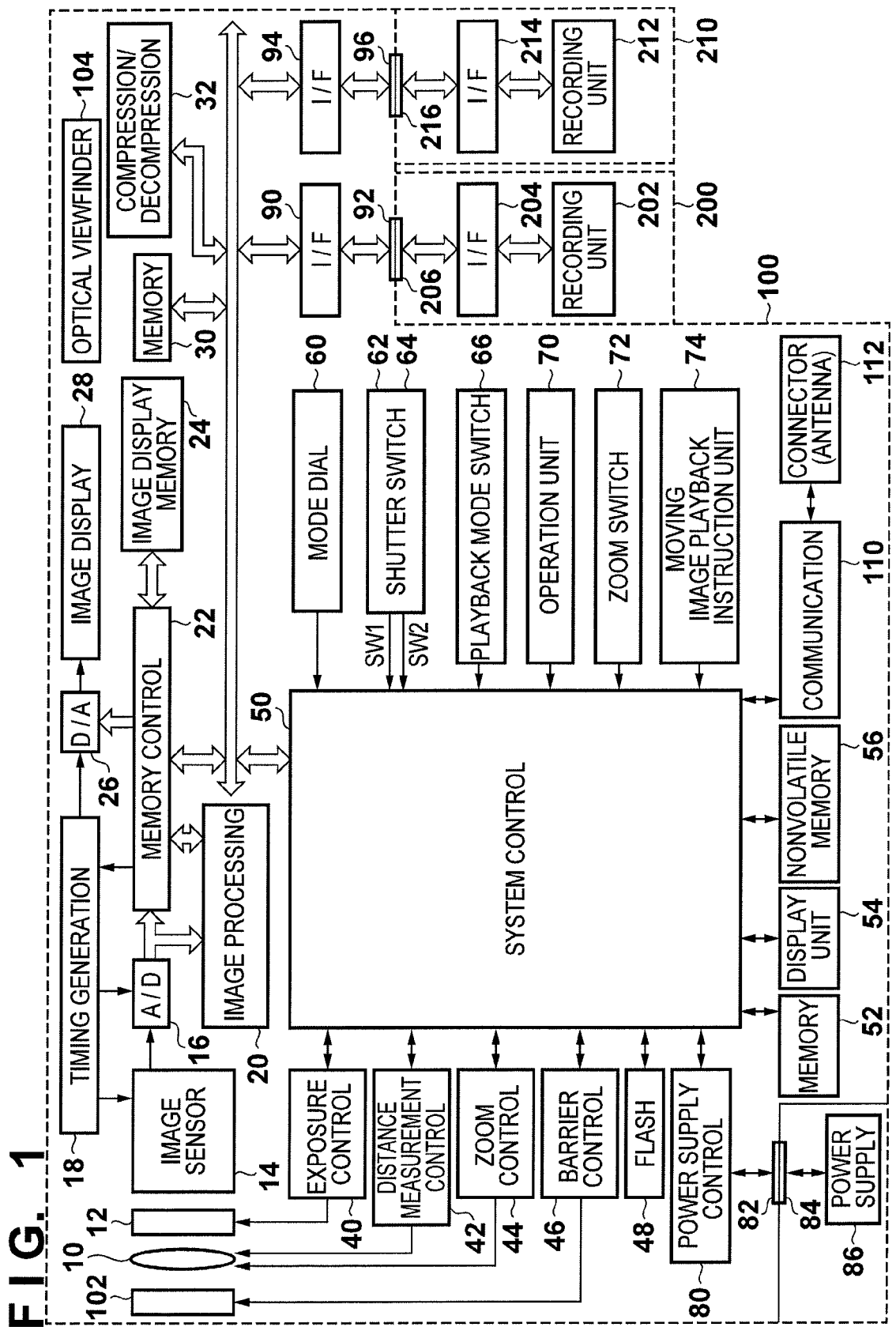
FIG. 1 is a block diagram showing an example of the arrangement of a digital camera according to an embodiment.

FIG. 1 is a block diagram showing an example of the arrangement of a digital camera according to the embodiment. Referring to FIG. 1, reference numeral 100 denotes a digital camera which also functions as a moving image playback apparatus; 10, a photographing lens; 12, a mechanical shutter including a stop function; 14, an image sensor for converting an optical image into an electric signal; 16, an A/D converter for converting the analog signal output of the image sensor 14 into a digital signal; and 18, a timing generation circuit, which supplies a clock signal and control signal to the image sensor 14, the A/D converter 16, and a D/A converter 26. A memory control circuit 22 and a system control circuit 50 control the timing generation circuit 18. Note that the system control circuit 50 is a microcomputer having or including a CPU and RAM. In addition to the mechanical shutter 12, the digital camera has an electronic shutter function for moving image shooting and the like, which controls the reset timing of the image sensor 14 by controlling its accumulation time.

Reference numeral 20 denotes an image processing circuit, which executes predetermined pixel interpolation processing and color conversion processing for data from the A/D converter 16 or memory control circuit 22. An electronic zoom function is implemented when the image processing circuit 20 extracts an image and performs scaling processing. Based on a calculation result obtained by executing predetermined calculation processing using captured image data by the image processing circuit 20, the system control circuit 50 controls an exposure control unit 40 and a distance measurement unit 42, thereby performing TTL AF processing, AE processing, and EF processing. Furthermore, the image processing circuit 20 executes predetermined calculation processing using captured image data, and then performs TTL AWB (auto white balance) processing based on the obtained calculation result.

The memory control circuit 22 controls the A/D converter 16, the timing generation circuit 18, the image processing circuit 20, an image display memory 24, the D/A converter 26, a memory 30, and a compression/decompression circuit 32. The data of the A/D converter 16 is written in the image display memory 24 or memory 30 via the image processing circuit 20 and memory control circuit 22 or via only the memory control circuit 22. Reference numeral 24 denotes the image display memory; 26, the D/A converter; and 28, an image display unit formed from a TFT-LCD. The image data for display, which have been written in the image display memory 24, are displayed by the image display unit 28 via the D/A converter 26. It is possible to implement an electronic viewfinder function by sequentially displaying captured image data using the image display unit 28. The image display unit 28 can arbitrarily turn on/off display in response to an instruction from the system control circuit 50. If display of the image display unit 28 is turned off, the power consumption of the digital camera 100 can be largely reduced.

The memory 30 is used to store shot still images and moving images, and has a memory capacity enough to store a predetermined number of still images and moving images for a predetermined time. Many images can, therefore, be written in the memory 30 at high speed even in sequential shooting for continuously shooting a plurality of still images, or panoramic shooting. The memory 30 is also usable as the work area of the system control circuit 50. The compression/decompression circuit 32 compresses/decompresses image data by adaptive discrete cosine transform (ADCT) or the like. The compression/decompression circuit 32 reads out an image stored in the memory 30, performs compression or decompression processing, and writes the processed image data in the memory 30.

The exposure control unit 40 controls the mechanical shutter 12 having the stop function. The exposure control unit 40 has a flash control function by cooperating with a flash 48. The distance measurement unit 42 controls focusing of the photographing lens 10. Reference numeral 44 denotes a zoom control unit, which controls zooming of the photographing lens 10; and 46, a barrier control unit, which controls the operation of a protection unit 102 serving as a barrier. The flash 48 has an AF auxiliary light projecting function and flash control function. The exposure control unit 40 and distance measurement unit 42 are controlled using the TTL scheme. The system control circuit 50 controls the exposure control unit 40 and distance measurement unit 42 based on a calculation result obtained by calculating captured image data by the image processing circuit 20.

Figure 2:
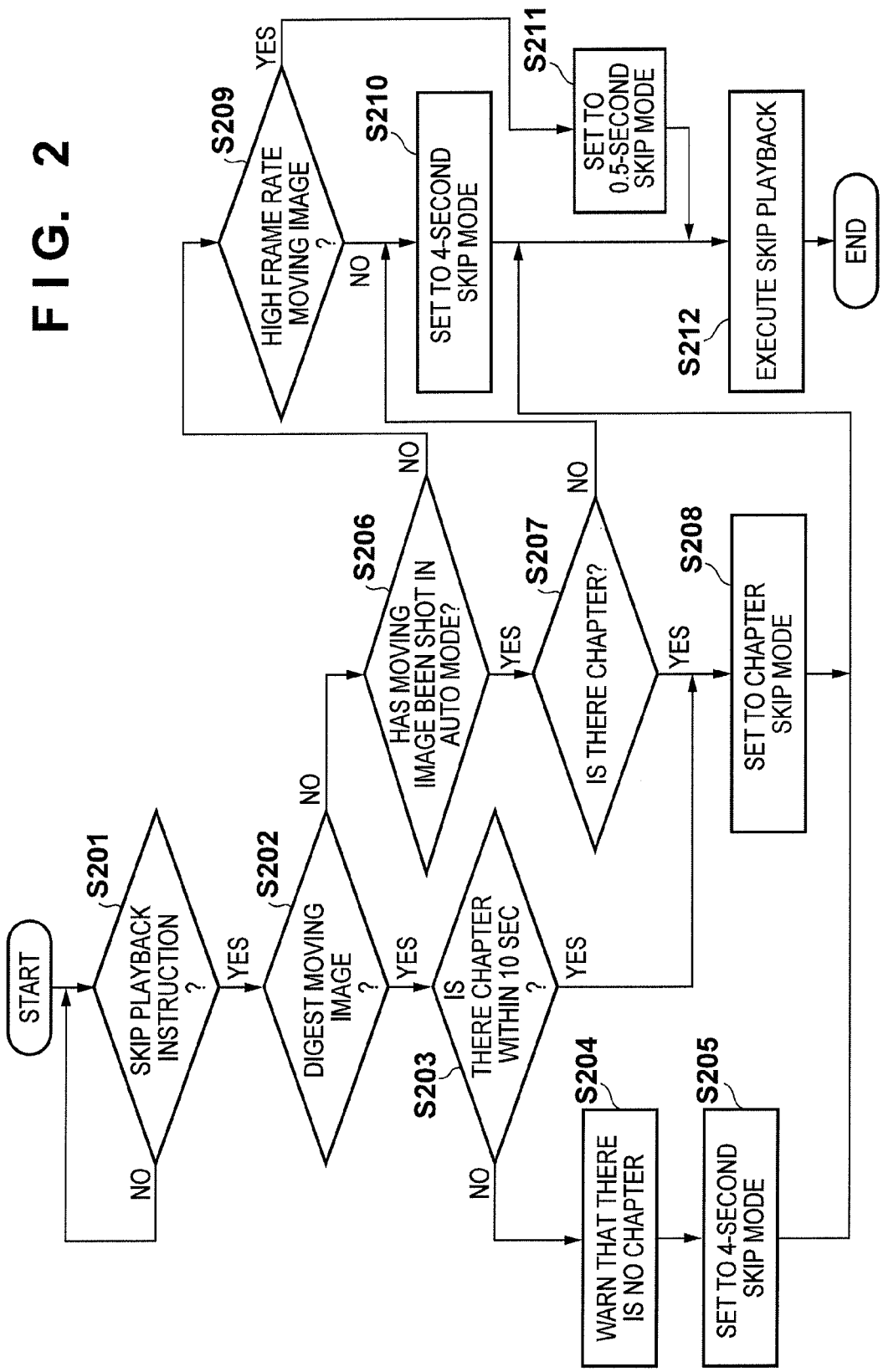
FIG. 2 is a flowchart illustrating a skip playback operation in the digital camera according the embodiment.

The system control circuit 50 controls the digital camera 100 as a whole such as execution of processing illustrated by a flowchart shown in FIG. 2. Reference numeral 52 denotes a memory, which stores constants, variables, and programs for the operation of the system control circuit 50; and 54, a display unit, which displays an operation state or message using characters, images, audio, and the like according to execution of a program by the system control circuit 50. The display unit 54 includes a liquid crystal display device and a loudspeaker, and is provided at a readily visually perceivable position near the operation unit of the digital camera 100. The display unit 54 is formed from a combination of an LCD, an LED, a sound-generating element, and the like.

Some functions of the display unit 54 are provided within an optical viewfinder 104. The display contents of an LCD or the like among those of the display unit 54 include single shooting/sequential shooting, a self-timer, a compression ratio, the number of recording pixels, the number of recorded images, the number of recordable images, a shutter speed, an F-number, exposure correction, flash, red eye reduction, and macro shooting. The LCD or the like can also display a buzzer setting, a remaining battery level, an error, information represented by a number with a plurality of digits, the attached/detached states of recording media 200 and 210, a communication I/F operation, and the like. The display contents of the optical viewfinder 104 among those of the display unit 54 include, for example, in-focus, camera shake warning, flash charge, a shutter speed, an F-value, and exposure correction.

Reference numeral 56 denotes an electrically erasable/recordable nonvolatile memory, for which an EEPROM or the like is used; and 60, 62, 64, 66, 70, 72, and 74, instruction operation units for inputting various operation instructions of the system control circuit 50, which are formed from one or a plurality of combinations of switches, a dial, a touch panel, pointing by detecting the line of sight, a speech recognition apparatus, and the like. These instruction operation units will be practically described below.

The mode dial switch 60 is used to switch between various function modes such as a power-off mode, still image shooting mode, panoramic shooting mode, moving image shooting mode, snap moving image shooting mode, playback mode, multi-window playback mode, PC connection mode, and TV reception mode. The first shutter switch (SW1) 62 is turned on in the middle of the operation of a shutter button, and then instructs to start a shooting preparation operation such as AF (auto focus) processing, AE (auto exposure) processing, and AWB (auto white balance) processing. The second shutter switch (SW2) 64 is turned on upon completion of the operation of the shutter button. When the second shutter switch is turned on, the start of the operation of the following series of processes is instructed.

an image loading process of writing, as image data, a signal read out from the image sensor 14 in the memory 30 via the A/D converter 16 and memory control circuit 22 a developing process using calculation in the image processing circuit 20 and memory control circuit 22 a compression processing executed by the compression/decompression circuit 32 for the image data read out from the memory 30 a recording process of writing the compressed image data in the recording medium 200 or 210

The display switching button 66 accepts an operation of switching display of the image display unit 28 by the user. This function can shut off current supply to the image display unit 28 formed from a TFT-LCD and the like when shooting an image using the optical viewfinder 104. Shutting off power supply to the image display unit 28 can save power.

The operation unit 70 is formed from various buttons, a touch panel, and the like, and includes a menu button, set button, macro button, multi-window playback/page feed button, flash setting button, single shooting/sequential shooting/self-timer switching button. The operation unit 70 also includes a menu move + (plus) button, menu move − (minus) button, playback image move + (plus) button, playback image move − (minus) button, shooting image quality selection button, exposure correction button, date/time setting button.

The zoom switch 72 is used by the user to instruct to zoom in/out a captured image. The zoom switch 72 includes a tele switch for changing the image capturing angle of view to the telephoto side and a wide switch for changing the image capturing angle of view to the wide angle side. The operation of the zoom switch 72 is used as a trigger to cause the system control circuit 50 to instruct the zoom control unit 44 to change the image capturing angle of view of the photographing lens 10, thereby achieving an optical zoom operation. The zoom switch 72 is also used as a switch for extracting an image by the image processing circuit 20, or providing a trigger to electronically change the image capturing angle of view by pixel interpolation processing or the like. The moving image playback instruction unit 74 is operated within a predetermined time after shooting a moving image, thereby starting to play back the shot moving image.

Reference numeral 80 denotes a power supply control unit, which includes a battery detection circuit, a DC-DC converter, and a switch circuit for switching a block to be supplied with power, and detects the presence/absence of attachment of a battery, the type of battery, and the remaining battery level. The power supply control unit 80 controls the DC-DC converter based on the detection result and an instruction from the system control circuit 50, and supplies a necessary voltage to each unit including a recording medium for a necessary period of time. Reference numeral 86 denotes a power supply, which includes a primary battery such as an alkaline battery or lithium battery, a secondary battery such as a NiCd battery, NiMH battery, or Li battery, and an AC adapter; and 82 and 84, connectors which connect the power supply 86 to the power supply control unit 80.

Reference numerals 90 and 94 denote interfaces with the recording media such as a memory card or hard disk; and 92 and 96, connectors which connect the recording media such as a memory card or hard disk to the interfaces 90 and 94, respectively. Note that in this embodiment, two sets each consisting of an interface and connector for attaching a recording medium are provided. The digital camera may include one or a plurality of sets each consisting of an interface and connector for attaching a recording medium, as a matter of course. Furthermore, the digital camera may include a combination of an interface and connector complying with different standards. An interface and a connector complying with a standard such as SD or CF card standard can be used.

An interface and a connector complying with a standard such as PCMCIA card standard can be used as the interfaces 90 and 94 and the connectors 92 and 96. For example, by complying with the PCMCIA card standard, it becomes possible to connect various communication cards such as a LAN card, modem card, USB card, IEEE1394 card, SCSI card, and PHS communication card. Connecting such communication card enables the digital camera 100 to send or receive image data and management information attached to the image data to or from a peripheral device such as another computer or a printer.

The protection unit 102 serves as a barrier for preventing an image capturing unit including the photographing lens 10 of the digital camera 100 from getting dirty or damaged by covering the image capturing unit. The optical viewfinder 104 enables shooting in the digital camera 100 using only the optical viewfinder without using the electronic viewfinder function of the image display unit 28. Some display functions of the display unit 54 such as in-focus, camera shake warning, flash charge, shutter speed, F-value, and exposure correction display functions are provided within the optical viewfinder 104.

Reference numeral 110 denotes a communication unit having various communication functions such as USB, IEEE1394, LAN, and wireless communication functions; and 112, a connector for connecting the digital camera 100 to another device by the communication unit 110, or an antenna for wireless communication. The recording medium 200 is, for example, a memory card or hard disk. The recording medium 200 includes a recording unit 202 including a semiconductor memory and magnetic disk, an interface 204 with the digital camera 100, and a connector 206 for connecting to the digital camera 100. The recording medium 210 has the same arrangement (a recording unit 212, interface 214, and connector 216) as that of the recording medium 200.

Figure 3:
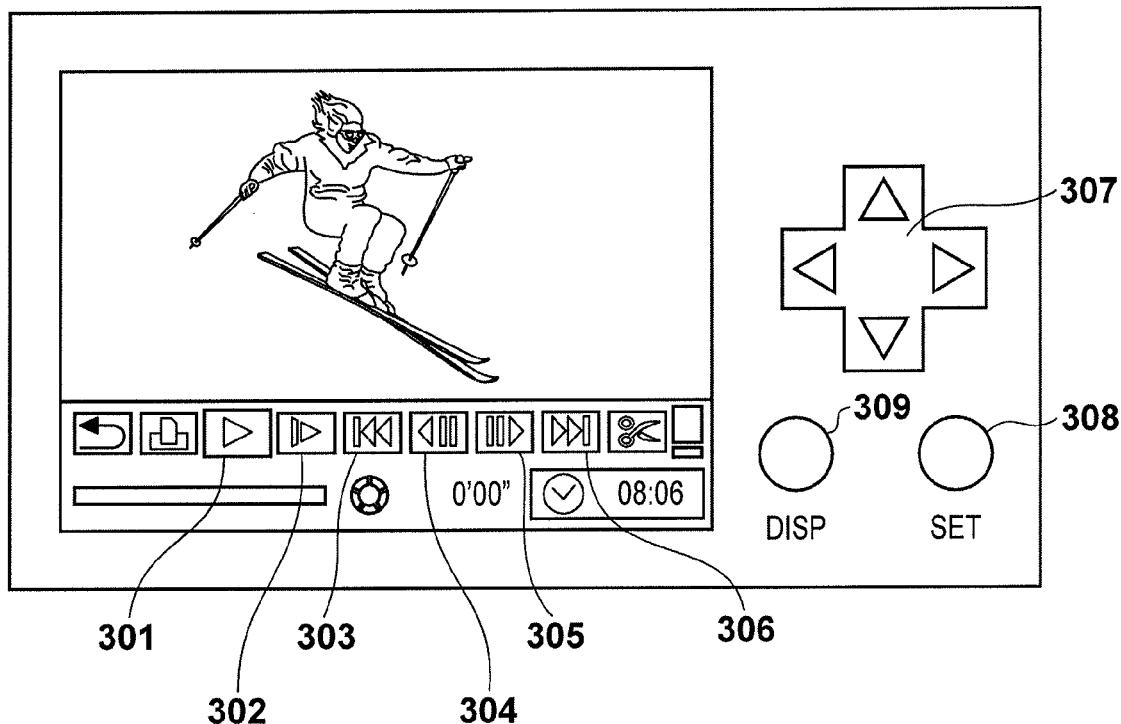
FIG. 3 is a view showing an example of an operation in the digital camera according to the embodiment.

A processing procedure when the digital camera 100 serving as an image playback apparatus accepts a skip playback instruction by a user operation during playback of a moving image will be described with reference to the flowchart shown in FIG. 2. Note that the following processing is mainly executed by the system control circuit 50. Processing shown in FIG. 2 is performed when a skip playback instruction is issued while the digital camera 100 plays back moving image data recorded in the recording medium 200 or 210, as shown in FIG. 3.

In skip playback, the system control circuit 50 selects and executes one of a plurality of skip search modes including first and second skip modes (to be described below) according to the type of moving image data being played back. Note that in the example, as the type of moving image data, "a moving image recorded in a digest moving image mode", "a moving image recorded in an AUTO mode", and "a moving image recorded at a high frame rate" are processed using a recording mode in recording the moving image. The present invention, however, is not limited to them. In this embodiment, the type of moving image data will be referred to as "type" of moving image for descriptive convenience.

The system control circuit 50 of the embodiment can execute a plurality of skip search modes including at least two skip search modes:
  the first skip search mode ("4-second skip mode" and "0.5-second skip mode" will be exemplified in this example) in which the playback position of moving image data currently played back is changed to a frame a predetermined time before or after a frame currently played back; and
  the second skip search mode (a chapter skip mode in this example) in which the playback position of moving image data currently played back is changed to a frame, at which a chapter has been added, immediately before or after a frame currently played back.

In step S201, the system control circuit 50 stands by for a skip playback instruction by the user. An example of a method of instructing skip playback by the user will be explained with reference to FIG. 3. FIG. 3 is a view showing the rear surface of the digital camera, in the right portion of which operation members (a four-way selector 307, a SET button 308, and a DISP button 309) forming part of the operation unit 70 are arranged, and in the left portion of which an LCD panel is arranged as the image display unit 28. The image display unit 28 displays a moving image playback screen and icons. In a state shown in FIG. 3, a playback icon 301 has been selected, and the moving image data of a moving image file stored in the recording medium 200 or 210 is being played back. Note that an operation of selecting a moving image file to be played back from moving image files recorded in the recording medium 200 or 210, and the like are well known, and a description thereof will be omitted. To issue a skip playback instruction, the left and right keys of the four-way selector 307 are used to select a reverse skip playback icon 304 or forward skip playback icon 305. If the user wants to execute reverse skip playback, he/she selects the reverse skip playback icon 304. If the user wants to execute forward skip playback, he/she selects the forward skip playback icon 305. The user then presses the SET button 308, thereby instructing skip playback in the designated direction.

Note that a slow playback icon 302 is used to instruct slow playback of a moving image. A start position icon 303 is used to instruct to skip to the first frame of a moving image. An end position icon 306 is used to instruct to skip to the last frame of a moving image. The user can select these icons by operating the left and right keys of the four-way selector 307 and the SET button 308.

Upon issuing a skip playback instruction, the process advances to step S202, and the system control circuit 50 refers to and analyzes the header information of a moving image file currently played back, and then determines whether a moving image to be played back is a digest moving image recorded in the digest moving image mode. For example, a moving image recording mode when shooting a moving image is stored in the file header of a moving image file, and the system control circuit 50 can determine based on the information whether the mode is the digest moving image mode. Note that the digest moving image indicates a moving image obtained when one of the shooting functions of the digital camera automatically shoots a moving image for a short time before or after shooting a still image, and collects the thus recorded moving images for a short time as digest scenes to save them as one moving image file. As a method of creating one moving image file from moving images for a short time, a method of adding a moving image shot before or after shooting an image to a last recorded moving image file is used. When adding a moving image, a chapter is automatically set at an addition point. For example, a chapter is recorded in association with a time code in the header data of the moving image file having undergone addition operation.

If it is determined in step S202 that the moving image is a digest moving image, the process advances to step S203, and the system control circuit 50 determines whether a chapter has been added within 10 sec of the moving image in a skip direction. Chapter information storing an offset time from the beginning of a frame at which a chapter has been added is recorded in the file header of the moving image file. Therefore, whether a chapter has been added within a predetermined time (10 sec in this example) from a frame currently played back can be determined by, for example, referring to chapter information recorded in the file header of the moving image file currently played back.

If it is determined in step S203 that a chapter has been added within 10 sec, the process advances to step S208, and the system control circuit 50 sets the skip search mode to the chapter skip mode. In step S212, the system control circuit 50 executes a chapter skip operation in the chapter skip mode.

Figure 4:
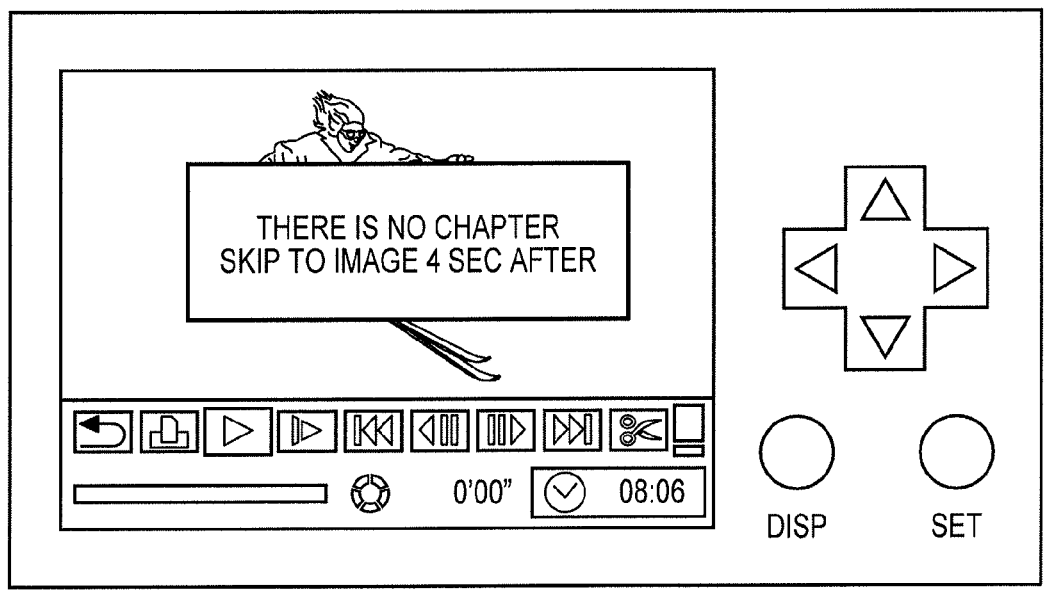
FIG. 4 is a view showing an example of display according to the embodiment.

On the other hand, if it is not determined in step S202 that a chapter has been added within 10 sec, the process advances to step S204, and the system control circuit 50 displays, on the image display unit 28, a screen for warning that there is no chapter. Note that the warning screen is displayed because a digest moving image assumes concatenation of moving images of 10 sec as a maximum, and it is assumed that there must be a chapter within 10 sec unless the user performs an edit operation or the like. FIG. 4 shows an example of the warning screen at this time. After displaying the warning screen in step S204, the system control circuit 50 sets the skip search mode to a mode in which a predetermined period is skipped (in the example, a 4-second skip mode in which a 4-second skip is executed) in step S205. In step S212, the system control circuit 50 executes a 4-second skip. With this operation, if the chapter skip mode has been selected according to the type of moving image data but a 4-second skip mode is selected, the user is notified of it.

If it is not determined in step S202 that the moving image is a digest moving image, the process advances to step S206, and the system control circuit 50 determines whether the current moving image playback mode is the AUTO mode. Whether the current mode is the AUTO mode can be determined by referring to information within the file header of the moving image file currently played back, similarly to the above-described determination whether the moving image is a digest moving image. In shooting a moving image in the AUTO mode, a scene being shot is automatically determined while shooting a moving image, and a chapter is added to the moving image file being recorded at a switching point of the moving image scene.

If it is determined in step S206 that the mode is the AUTO mode, the process advances to step S207, and the system control circuit 50 determines for all moving image frames in the skip direction whether a chapter has been added. That is, if the instructed skip direction is the reverse direction, it is determined for frames from a frame currently played back to the first frame of the moving image data whether a chapter has been added. If the instructed skip direction is the forward direction, it is determined for frames from the frame currently played back to the last frame of the moving image data whether a chapter has been added. If it is determined in step S207 that there is a frame, in the skip direction, at which a chapter has been added, the process advances to step S208. The system control circuit 50 sets the skip search mode to the chapter skip mode in step S208, and executes a chapter skip in step S212. In this case, therefore, in response to the skip playback instruction, a skip to a frame at which the moving image scene is switched to the next moving image scene in the instructed skip direction is executed.

If it is determined in step S207 that no chapter has been added in the skip direction, the process advances to step S210. The system control circuit 50 sets the skip search mode to the 4-second skip mode in step S210, and executes a 4-second skip in step S212. Note that a warning of the absence of a chapter may be displayed at this time, as in step S204.

As described above, if the chapter skip mode is to be selected according to the type of moving image data currently played back, it is further determined whether a chapter has been added at any one of frames within a specific range. For example, for a digest moving image, the frames within the specific range indicate frames within a predetermined time (10 sec in the above example) from a frame currently played back. If no chapter has been added at any one of the frames within the specific range, the 4-second skip mode is executed. Alternatively, for a moving image recorded in the AUTO mode, the frames within the specific range indicate frames from the frame currently played back to the first frame if the instructed skip direction is the reverse direction, and frames from the frame currently played back to the last frame if the instructed skip direction is the forward direction. If a chapter has been added at any one of the frames within the specific range, the chapter skip mode is executed; otherwise, the 4-second skip mode is executed. This processing can prevent a problem that no chapter has been added at any one of the remaining moving image frames and thus the playback position directly skips to the end of the moving image data by a chapter skip.

If it is determined in step S206 that the moving image has not been recorded in the AUTO mode, the process advances to step S209. In step S209, the system control circuit 50 determines whether the moving image file currently played back is a high frame rate moving image. Whether the moving image file is a high frame rate moving image can be determined by referring to the information within the file header of the moving image file currently played back, similarly to the determination whether the moving image is a digest moving image.

If it is determined in step S209 that the moving image file is a high frame rate moving image, the process advances to step S211. The system control circuit 50 sets the skip search mode to the 0.5-second skip mode in step S211, and executes a 0.5-second skip operation in step S212, thereby terminating the process. On the other hand, if it is determined in step S209 that the moving image file is not a high frame rate moving image, the process advances to step S210. The system control circuit 50 sets the skip search mode to the 4-second skip mode in step S210, and executes a 4-second skip in step S212. As described above, in steps S209 to S211, the system control circuit 50 changes, according to the type of moving image data currently played back, a predetermined time in the skip search mode in which the predetermined time is skipped.

As described above, according to the aforementioned embodiment, if skip playback of a moving image is instructed by one operation of one member, a skip search mode appropriate to the moving image to be played back is automatically determined based on the type of moving image and then skip playback of the moving image is executed, thus improving the operability. That is, if the user instructs skip playback of a moving image by one operation of one member, a skip search mode appropriate to the moving image to be played back is automatically selected based on the type of moving image, and then skip playback of the moving image is executed. The user can, therefore, execute skip playback to a desired playback position by a simple operation. Furthermore, even if the same operation is performed, the skip search mode is automatically changed. Therefore, it is possible to realize switching of the skip search mode even in a device including a small number of operation members, such as a mobile device.

Although the present invention has been described in detail based on the preferred embodiment, the present invention is not limited to the specific embodiment, and includes various modes without departing from the scope of the spirit and scope thereof.

For example, the moving image mode is determined by analyzing the file header in the above example but the present invention is not limited to this. For some moving image recording modes, a moving image mode can be identified based on the file name of a moving image file or part of it. In this case, a moving image mode may be determined based on a moving image file name. Furthermore, whether the moving image is a high frame rate moving image may be determined by referring to frame rate information, in moving image recording, of the file header of the moving image, instead of moving image mode information of the file header. Alternatively, another method may be used.

Furthermore, a method other than the aforementioned one may be used as a method of determining the type of moving image. For example, the type of moving image may be determined by a user setting in recording or by determining whether a still image has been recorded during recording of the moving image, instead of a moving image recording mode.

In the above example, the file header is referred to when determining whether a chapter has been added and a position where a chapter has been added. However, a method of adding a chapter may be different depending on the file format of a moving image. In this case, by using a method according to the file format, it is determined whether a chapter has been added and a position where a chapter has been added is specified. For example, if information indicating whether a chapter has been added at the beginning of the encode data of each frame of a moving image is included, the beginning of the encode data of a target frame is searched for, thereby determining whether a chapter has been added and specifying a chapter addition position.

In terms of the moving image playback method and skip playback instruction method, in addition to the methods described in the embodiment, buttons for instructing playback, stop, and skip may be individually assigned to physical buttons, or an instruction may be given by operating a touch panel. Alternatively, parts of the above-described embodiment may be combined, as needed.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-163072, filed Jul. 23, 2012, which is hereby incorporated by reference herein in its entirety.

What is claimed is:
1. A moving image playback apparatus comprising:
a recording unit configured to record on a recording medium a moving image file including moving image data,
wherein for each moving image file being recorded the recording unit records the moving image data in only one recording mode including a digest recording mode and a high frame rate recording mode,
wherein a chapter is added within a predetermined time to a frame corresponding to a position to which the moving image data is added in the moving image file in said digest recording mode;
a playback unit configured to play back moving image data from the recording medium; and
a controller configured to change a playback position of the moving image data being played back by the playback unit according to a predetermined instruction from a user for skipping a playback position of moving image data, wherein the controller detects the recording mode of the moving image data being played back and selects, according to the detected recording mode of the moving image data being played back, one of a plurality of skip search modes including a first skip search mode in which the playback position of the moving image data currently played back is changed to a frame a predetermined time before or after a frame currently played back, and a second skip search mode in which the playback position of the moving image data currently played back is changed to a frame corresponding to a chapter before or after the frame currently played back, and wherein the controller selects the first skip search mode if the recording mode of the moving image data currently played back is said high frame rate recording mode, and selects the second skip search mode if the recording mode of the moving image data currently played back is said digest recording mode.

2. The apparatus according to claim 1, wherein the controller changes the predetermined time in the first skip search mode according to the moving image data currently played back.

3. The apparatus according to claim 1, wherein in the second skip search mode, if a chapter has been added at any one of frames within a specific range in a skip direction, the controller changes the playback position to the frame corresponding to the chapter, and if no chapter has been added at any one of the frames within the specific range in the skip direction, the controller changes the playback position to a frame a predetermined time before or after the frame currently played back.

4. The apparatus according to claim 3, wherein the frames within the specific range are frames within the predetermined time from the frame currently played back.

5. The apparatus according to claim 3, wherein the frames within the specific range are frames from the frame currently played back to the first frame of the moving image data if an instructed skip direction is a reverse direction, and frames from the frame currently played back to the last frame of the moving image data if the instructed skip direction is a forward direction.

6. The apparatus according to claim 3, wherein in the second skip search mode, if the playback position is changed to a frame the predetermined time before or after the frame currently played back, the controller notifies a user that the play back position is not changed to the frame corresponding to the chapter but the frame predetermined time before or after the frame currently played back.

7. The apparatus according to claim 1, wherein the controller determines the recording mode of the moving image data based on a file header of the moving image file.

8. The apparatus according to claim 1, wherein the controller determines the recording mode of the moving image data based on a file name of the moving image file.

9. A control method for a moving image playback apparatus, comprising:

recording on a recording medium a moving image file including moving image data, wherein for each moving image file being recorded the recording records the moving image data in only one recording mode including a digest recording mode and a high frame rate recording mode, wherein a chapter is added to a frame corresponding to a position to which the moving image data is added in the moving image file;

playing back moving image data from the recording medium;

detecting the recording mode of the moving image data being played back;

selecting, according to the detected recording mode of the moving image data currently played back, one of a plurality of skip search modes including a first skip search mode in which a playback position of the moving image data currently played back is changed to a frame a predetermined time before or after a frame currently played back, and a second skip search mode in which the playback position of the moving image data currently played back is changed to a frame, where a chapter has been added, immediately before or after the frame currently played back; and wherein the selecting selects the first skip search mode if the recording mode of the moving image data currently played back is said high frame rate recording mode, and selects the second skip search mode if the recording mode of the moving image data currently played back is said digest recording mode.

10. A moving image playback apparatus comprising:

a playback unit configured to play back from a recording medium moving image data in a moving image file, wherein the moving image data in each moving image data file has been recorded in only one recording mode including a digest recording mode and a high frame rate recording mode, wherein a chapter is added within a predetermined time to a frame corresponding to a position to which the moving image data is added in the moving image file in said digest recording mode;

a display unit configured to display on a display device a moving image relating to the moving image data being played back by the playback unit and a predetermined display item for instructing to skip a playback position;

a controller configured to change a playback position of the moving image data being played back by the playback unit in accordance with a user manipulating the predetermined display item, wherein the controller detects the recording mode of the moving image data being played back and changes the playback position of the moving image data currently played back in accordance with the recording mode of the moving image data being played back such that (1) if the recording mode of the moving image data currently played back is said high frame rate recording mode, the playback position of the moving image data currently played back is changed to a frame a predetermined time before or after a frame currently played back in accordance with the user manipulating the predetermined display item, and (2) if the recording mode of the moving image data currently played back is said digest recording mode, the playback position of the moving image data currently played back is changed to a frame corresponding to the chapter in accordance with the user manipulating the predetermined display item.

11. A control method for a moving image playback apparatus, comprising:

playing back from a recording medium moving image data, wherein the moving image data in each moving image file has been recorded in only one recording mode including a digest recording mode and a high frame rate recording mode, wherein a chapter is added within a predetermined time to a frame corresponding to a position to which the moving image data is automatically added in said digest recording mode;

displaying on a display device a moving image relating to the moving image data being played back and a predetermined display item for instructing to skip a playback position;

changing a playback position of the moving image data being played back by the playback unit in accordance with a user manipulating the predetermined display item;

detecting the recording mode of the moving image data being played back, changing the playback position of the moving image data currently played back in accordance with the recording mode of the moving image data being played back such that (1) if the recording mode of the moving image data currently played back is said high frame rate recording mode, the playback position of the moving image data currently played back is changed to a frame a predetermined time before or after a frame currently played back in accordance with the user manipulating the predetermined display item, and (2) if the recording mode of the moving image data currently played back is said digest recording mode, the playback position of the moving image data currently played back is changed to a frame corresponding to the chapter in accordance with the user manipulating the predetermined display item.

* * * * *